US009053551B2

(12) United States Patent
Beymer et al.

(10) Patent No.: US 9,053,551 B2
(45) Date of Patent: *Jun. 9, 2015

(54) VESSEL IDENTIFICATION USING SHAPE AND MOTION MAPPING FOR CORONARY ANGIOGRAM SEQUENCES

(75) Inventors: David J. Beymer, San Jose, CA (US); Hayit Greenspan, Los Gatos, CA (US); Tanveer Syeda-Mahmood, San Jose, CA (US); Fei Wang, San Jose, CA (US); Yong Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/479,219

(22) Filed: May 23, 2012

(65) Prior Publication Data

US 2013/0315457 A1 Nov. 28, 2013

(51) Int. Cl.
| G06K 9/00 | (2006.01) |
| G06T 7/00 | (2006.01) |
| G06K 9/46 | (2006.01) |
| G06K 9/62 | (2006.01) |

(52) U.S. Cl.
CPC ............ *G06T 7/0085* (2013.01); *G06K 9/4671* (2013.01); *G06K 9/6269* (2013.01); *G06K 9/628* (2013.01); *G06T 2207/30101* (2013.01); *G06T 2207/30172* (2013.01)

(58) Field of Classification Search
None
See application file for complete search history.

(56) References Cited

U.S. PATENT DOCUMENTS

| 5,444,791 | A | * | 8/1995 | Kamada et al. ............... 382/190 |
| 5,581,665 | A | * | 12/1996 | Sugiura et al. ................ 700/251 |
| 6,073,042 | A | | 6/2000 | Simonetti |
| 6,501,848 | B1 | | 12/2002 | Carroll et al. |
| 6,760,488 | B1 | * | 7/2004 | Moura et al. .................. 382/285 |
| 6,873,724 | B2 | * | 3/2005 | Brand ............................ 382/154 |
| 7,006,683 | B2 | * | 2/2006 | Brand ............................ 382/154 |
| 7,471,814 | B2 | | 12/2008 | Raman et al. |
| 7,551,758 | B2 | | 6/2009 | Florent et al. |
| 7,586,501 | B2 | | 9/2009 | Aharon et al. |
| 7,742,629 | B2 | | 6/2010 | Zarkh et al. |
| 7,773,792 | B2 | | 8/2010 | Kimmel et al. |
| 7,961,920 | B2 | | 6/2011 | Netsch et al. |

(Continued)

FOREIGN PATENT DOCUMENTS

| WO | WO 2009024919 A2 * | 2/2009 |
| WO | WO 2012044311 A1 * | 5/2012 |

OTHER PUBLICATIONS

Ruan et al., "3D motion and reconstruction ofcoronary networks." Engineering in Medicine and Biology Society, 1992 14th Annual International Conference of the IEEE. vol. 5. IEEE, 1992.*

(Continued)

*Primary Examiner* — Michelle Entezari
(74) *Attorney, Agent, or Firm* — Lieberman & Brandsdorfer, LLC (57) ABSTRACT

Embodiments of the invention relate to a method, system, and computer program product to automate image classification with respect to coronary vessels in an angiography sequence. Two primary elements are employed, including training and recognition. Training pertains to the pre-processing images and extracting salient features that characterize the appearance of coronary arteries under different viewpoints. Recognition pertains to extraction of features from a new image sequence and determining a classification boundary for the new image from previously classified and labeled image sequences.

14 Claims, 8 Drawing Sheets

(56) References Cited

U.S. PATENT DOCUMENTS

| | | | |
|---|---|---|---|
| 7,991,453 | B2 | 8/2011 | Florent et al. |
| 2004/0252230 | A1* | 12/2004 | Winder ................. 348/402.1 |
| 2010/0278405 | A1* | 11/2010 | Kakadiaris et al. .......... 382/131 |
| 2011/0305322 | A1* | 12/2011 | Van Den Houten et al. .......... 378/98.12 |
| 2012/0078097 | A1* | 3/2012 | Wang et al. ................. 600/437 |

OTHER PUBLICATIONS

Shape and Nonrigid Motion Estimation through Physics-Based Synthesis Dimitri Metaxas, Member, IEEE, and Demetri Terzopoulos, Member, IEEE, IEEE Transactions on Pa7tern Analysis and Machine Intelligence, vol. 15, No. 6, Jun. 1993.*

Schneider et al., Automatic Global Vessel Segmentation and Catheter Removal Using Local Geometry Information and Vector Field Integration, Biomedical Imaging: From Nano to Macro, 2010 IEEE International Symposium on, Apr. 14-17, 2010, pp. 45-48.

Syeda-Mahmood et al., Automatic Selection of Keyframes From Angiogram Videos, International Conference on Pattern Recognition (ICPR2010), Turkey 2010, pp. 4008-4011.

Akinyemi et al., Automatic Labelling of Coronary Arteries, 17th European Signal Processing Conference (EUSIPCO 2009), Aug. 24-28, 2009, pp. 1562-1566.

Schaap et al., Standardized Evaluation Methodology and Reference Database for Evaluating Coronary Artery Centerline Extraction Algorithms, Medical Imaging Analysis, 2009, pp. 1-14.

Zhang et al., Motion Context: A New Representation for Human Action Recognition, ECCV 2008, Part IV, LNCS 5305, pp. 817-829, 2008.

Perfetti et al., A CNN Based Algorithm for Retinal Vessel Segmentation, 12th WSEAS International Conference on Circuits, Heraklion, Greece, pp. 152-157, Jul. 22-24, 2008.

Bosch et al., Representing Shape With a Spatial Pyramid Kernel, CIVR '07, Jul. 9-11, 2007, Amsterdam, The Netherlands.

Wang et al., Object Detection Combining Recognition and Segmentation, Proceedings of the 8th Asian Conference on Computer Vision, vol. 4843 of Lecture Notes in Computer Science, ACCV2007, pp. 189-199, 2007.

Turgeon et al., 2D-3D Registration of Coronary Angiograms for Cardiac Procedure Planning and Guidance, Med. Phys. 32 (12), pp. 3737-3749, 2005.

Grauman et al., The Pyramid Match Kernel: Discriminative Classification with Sets of Image Features, Proceeding of the IEEE Conference on Computer Vision, Beijing, China, pp. 1458-1465, Oct. 2005.

Steger, An Unbiased Detector of Curvilinear Structures, IEEE Transactions on Pattern Analysis and Machine Intelligence, vol. 20, No. 2, Feb. 1998.

Belongie et al., Shape Matching and Object Recognition Using Shape Contexts, IEEE Transactions on Pattern Analysis and Machine Intelligence, vol. 24, No. 24, pp. 509-522, Apr. 2002.

Haris et al., Model-Based Morphological Segementation and Labeling of Coronary Angiograms, IEEE Transactions on Medical Imaging, vol. 18, No. 10, pp. 1003-1015, Oct. 1999.

Sato et al., Three-Dimensional Multi-Scale Line Filter for Segmentation and Visualization of Curvilinear Structures in Medical Images, Medical Image Analysis, vol. 2, No. 2, pp. 143-168, 1998.

Frangi et al., Multiscale Vessel Enhancement Filtering, Medical Image Computing and Computer-Assisted Intervention—MICCAI '98, vol. 1496, pp. 130-137, Berlin, Germany 1998.

Sonka, et al., Robust Simultaneous Detection of Coronary Borders in Complex Images, IEEE Transacitons on Medical Imaging, vol. 14, No. 1, pp. 151-161, Mar. 1995.

Dumay et al., Automated Extraction, Labelling and Analysis of the Coronary Vasculature From Arteriograms, The International Jounral of Cardiac Imaging, vol. 10, No. 3, pp. 205-215, 1994.

Dumay et al., Consistent Inexact Graph Matching Applied to Labelling Coronary Segments in Arteriograms, IEEE, pp. 439-442, 1992.

* cited by examiner

VESSEL IDENTIFICATION USING SHAPE AND MOTION MAPPING FOR CORONARY ANGIOGRAM SEQUENCES

BACKGROUND

This invention relates to automated image classification. More specifically, the invention relates to a method and system for identifying and labeling coronary vessels in an angiography sequence.

Coronary angiography is a procedure that uses a contrast material and x-rays to examine blood vessels and/or chambers of the heart. The angiography is an important diagnostic tool in cardiology and facilitates the functional assessment of cardiovascular diseases. During an angiography exam, a catheter is inserted into a blood vessel, the tip of which is positioned either in the heart or at the beginning of the arteries supplying the heart. A contrast medium (or radio opaque dye) is injected, and is outlined by x-ray to produce image sequences referred to herein as runs. A typical angiography study consists of several runs, each run depicting a different vessel seen from a select viewpoint. Each study on average consists of 20-25 runs, with each run consisting on average of 15-120 images, depending on the complexity of the arteries being shown and their associated pathology. A cardiologist reviews the study to detect a constricting of the artery, also known as stenosis.

The two main vessels that are examined during the study are the left coronary artery (LCA) and the right coronary artery (RCA) and their branches. The appearance in images can be quite different due to changes in viewpoint, occlusions, and partial appearances as they become visible or fade away. Reliable recognition of content requires robust modeling of both texture and geometric layout that causes the changes in artery appearance under various conditions.

The analysis of coronary arteries encompasses a large body of work. Most of the work addresses accurate vessel delineation and extracting vessel boundaries and vessel centerline. These methods assume that a given image depicts a vessel structure and not a background image. More specifically, these known methods rely on user interaction to select a segment of interest. Accordingly, the prior art methodologies employ input to identify the subject artery.

BRIEF SUMMARY

This invention comprises a system and article for identification and classification of a coronary vessel in an angiography sequence.

In one aspect of the invention, a computer program product is provided with a computer readable storage medium having embodied computer readable program code to classify a coronary vessel in an angiography sequence. Instructions are provided to detect and label regions of interest in a subset of images which contain a coronary vessel. Once detected, instructions are provided to estimate the shape and motion in the subset of images of the sequence and to extract the centerline curves of vessels. Instructions are further provided to compute the optical flow within an angiogram sequence. In addition, the computer readable program code contains instructions to sample the extracted centerline curves of a vessel and generate feature points, and to sample a surrounding region of the generated feature points to capture shape and motion context of a depicted vessel. Further instructions are provided to use pyramid histogram data of shape and motion context to form a feature set for classification of the depicted vessel(s). The computer readable program code also contains instructions to determine a set of characteristics separating data in feature space, and to return a classification result for a new sequence of images based on a vessel's recognized shape and motion. These instructions include fitting a multiclass support vector machine to computed features and determining where a vessel feature lies in the feature space against a classification boundary.

In another aspect of the invention, a system is provided with a processor in communication with memory and data storage. A functional unit is provided in communication with the memory. More specifically, the functional unit is provided to classify a coronary vessel in an angiography image sequence. The functional unit includes a pre-processing image manager, a training vector manager, and a director. The pre-processing image manager detects and labels regions of interest in a subset of images of the image sequence and estimates the shape and motion in the subset. More specifically, the image manager extracts the centerline curves of coronary vessels and computes the optical flow within an angiogram sequence. The pre-processing image manager further samples the extracted centerline curves to generate feature points, and the surrounding region of the generated feature points to capture shape and motion context of the depicted vessel. The pre-processing image manager further forms feature set for classification of vessels based on the capture shape and motion context. The training vector manager trains a multiclass support vector machine to determine a set of characteristics separating data in feature space. The training vector manager derives feature sets from pyramid histograms of the samplings sampled by the image manager, and employs angiogram sequences with known view point labels. The director returns a classification result for a new sequence of images based on the recognized shape and motion of the vessel, and fits the multiclass support vector machine to computed features.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification have been labeled as having managers and director(s). A functional unit may be implemented in programmable hardware devices such as field programmable gate arrays, programmable array logic, programmable logic devices, or the like. The functional unit may also be implemented in software for processing by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers and directors, including but not limited to an image manager, a graph manager, and a flow, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the field of cardiology, it is known to perform interventional procedures to assess the health and/or damage associated with cardiac vessels and structures. The novel aspects disclosed herein address automatic classification of an unknown frame of an angiography sequence. It can also reveal the identity of the artery being depicted in an image when the given image is not a background image. Local motion content of the angiography video around the anatomical structures, e.g. cardiac vessels, is represented using motion content in the form of a motion histogram representation in polar coordinates. The global motion layout is captured as pyramid histograms of the motion context, also referred to herein as PHMC. In one embodiment, the PHMC is a robust representation of the motion features in a video sequence. In addition to the classification, angiography sequences are pre-processed to select key frames within the sequences and detect regions of interest in frames. Accordingly, these key frames are subsequently classified and labeled, distinguishing coronary vessels from images of background.

Figure 1:
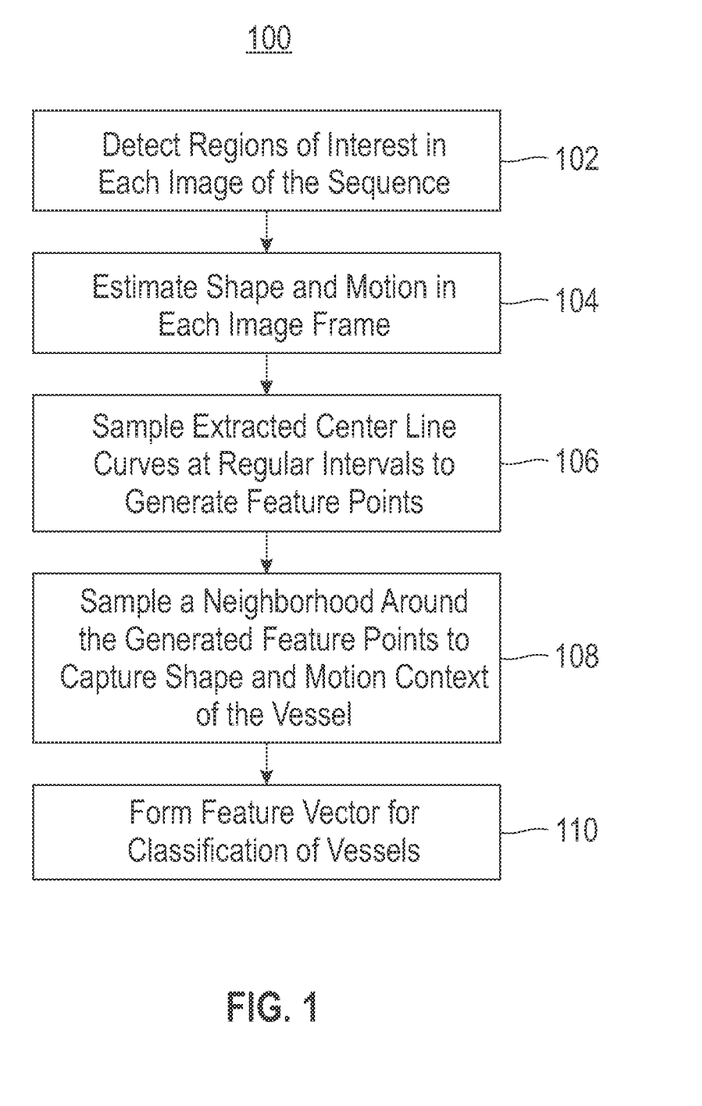
FIG. 1 is a flow chart pre-processing a coronary angiography sequence of images to filter irrelevant images and to increase the robustness of recognition.

As explained above, a typical angiography study consists of several runs, with each run typically consisting of 15-120 images, depending on the complexity of the arteries being shown and their pathology. Since the frames of interest for a diagnosis are ones that show a clear depiction of the vessel, and only a handful of the thousands of images in an angiography are such images, it is important to filter the irrelevant images by a pre-processing step to increase the robustness of recognition. FIG. 1 is a flow chart (100) illustrating pre-processing a coronary angiography sequence of images to filter irrelevant images and to increase the robustness of recognition. The initial step is to detect and label regions of interest in each image of the sequence (102). In one embodiment, the regions of interest show a clear depiction of a coronary vessel. Angiograms typically have a rectangular region of interest that contains the x-ray signal within the rectangular region surrounded by one or two uniform grey regions. Identifying the bounding boxes $(x_0, y_0, x_1, y_1)$ associated with the region of interest will avoid potential confusion caused by false edges generated on the region of interest boundary.

What distinguishes x-ray foreground pixels from uniform background pixels is pixel variance, measured both spatially and temporally. Spatially, pixel variance will be high in the region of interest foreground region due to image structure and noise, and temporal variance will be caused by motion. In the uniform background regions, both spatial and temporal variance is low. To find the bounding box coordinates $x_0$ and $x_1$, we consider measures of time t and y variance as a function of x, as follows:

$$c_1(x) = \sum_y \sigma_t(x, y)$$

-continued $$c_2(x) = \sum_t \sigma_y(x, t)$$

where $\sigma_t(x, y)$ is the standard deviation of intensities at (x, y) sampling across the entire sequence. Likewise, $\sigma_y(x, t)$ is the standard deviation of intensities in the x column of pixels at time t. Finding the major variance changes in $c_1(x)$ and $c_2(x)$ is similar to a one dimensional edge detection. To localize $x_o$ and $x_1$, the product of derivatives is assessed to find two major peaks. The product of derivatives is represented as follows:

$$c_3(x) = \delta c_1/\delta x \cdot \delta c_2/\delta x$$

In one embodiment, locating $y_0$ and $y_1$ can be done similarly by reversing the roles of x and y. Accordingly, the spatial and temporal pixel variances are computed and major changes in the gradient of those pixel variances are found, with a bounding box determined on at least two major peaks.

Figure 2:
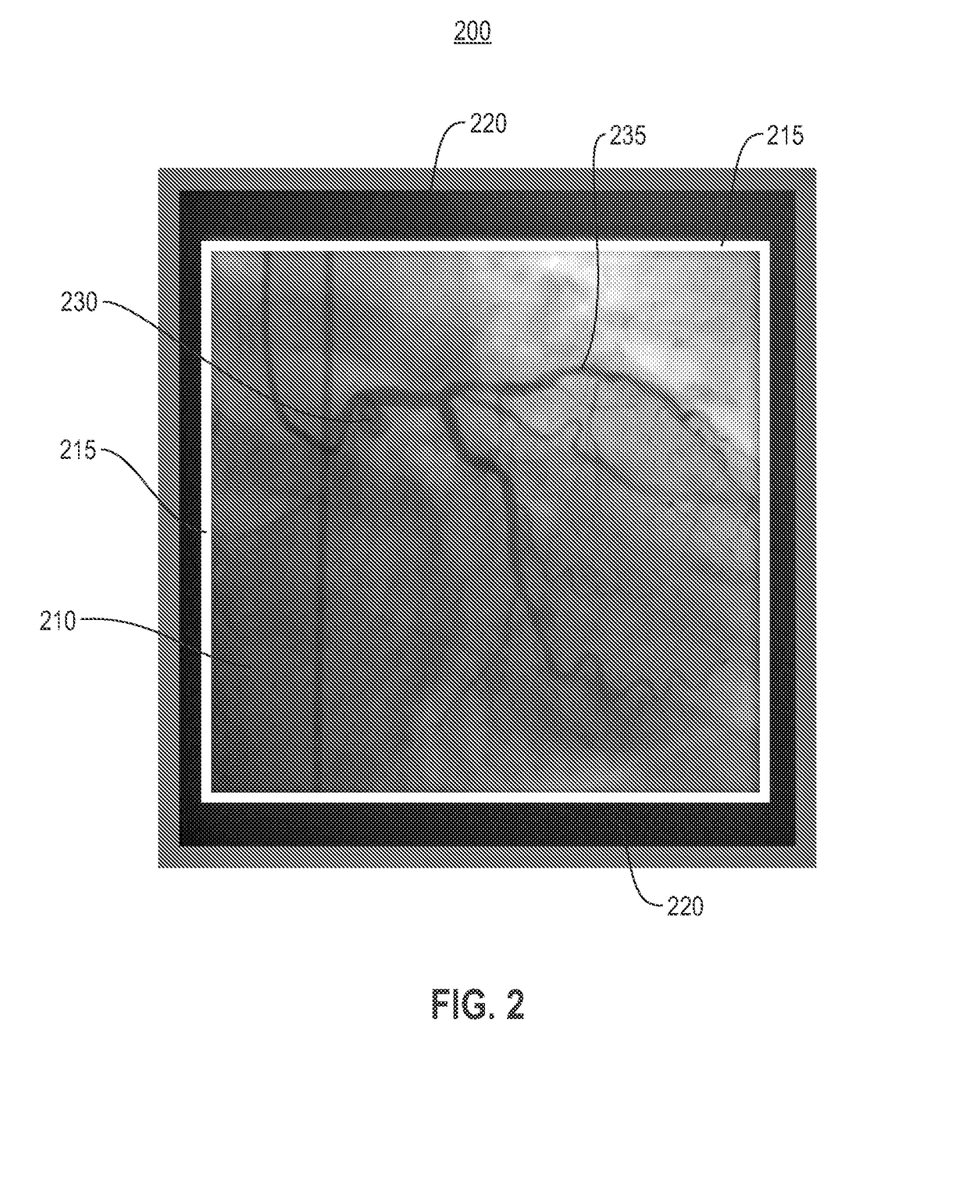
FIG. 2 is a diagram illustrating an example angiogram image.
Figure 3:
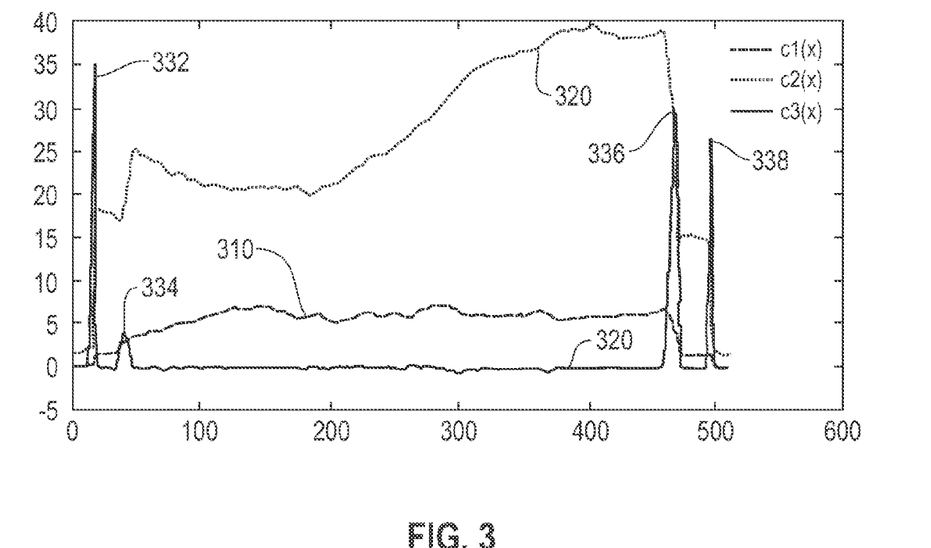
FIG. 3 is an example temporal variance diagram for the angiogram image of FIG. 2.

FIG. 2 is a diagram (200) of an example angiogram image, and FIG. 3 is an example of a temporal variance diagram for the angiogram image of FIG. 2. With respect to FIG. 2, a region of interest (210) is shown with borders (215) and (220) surrounding the region of interest. In addition, within the region of interest (210) there are multiple background regions, including regions (230) and (235). As noted above, FIG. 3 is a temporal variance diagram taken from the angiogram image of FIG. 2. What distinguishes x-ray foreground pixels from uniform background pixels is pixel variance, measured both spatially and temporally. In the uniform background regions, both spatial and temporal variance is low. Spatially, pixel variance will be high in the region of interest foreground region due to image structure and noise, and temporal variance will be caused by motion, e.g. non-rigid heart and rigid table motion. As shown in FIG. 3, the image shows temporal variance (310), spatial variance (320), and product x-derivatives (330). Four peaks (332), (334), (336), and (338) are shown in this example in the x-derivatives because there are two background regions.

In an angiogram video of a heart cycle, different cardiac vessels depicted in different angiogram sequences differ in terms of their overall shape and topology, and also demonstrate different amounts of motion in magnitude and direction. Those motions are different for different vessels while similar for image sequences belonging to the same vessel. Following step (102), the shape and motion in each image frame is estimated (104). The centerlines of the vessels are employed as a representation of the shape of the coronary artery trees. As such the estimation at step (104) includes extraction of the centerline curves of arteries in each image, and their local geometry and motion are sampled to capture the essence of the relevant content depicted in these images. To capture the motion information, the optical flow for angiogram sequences is computed.

Figure 4:
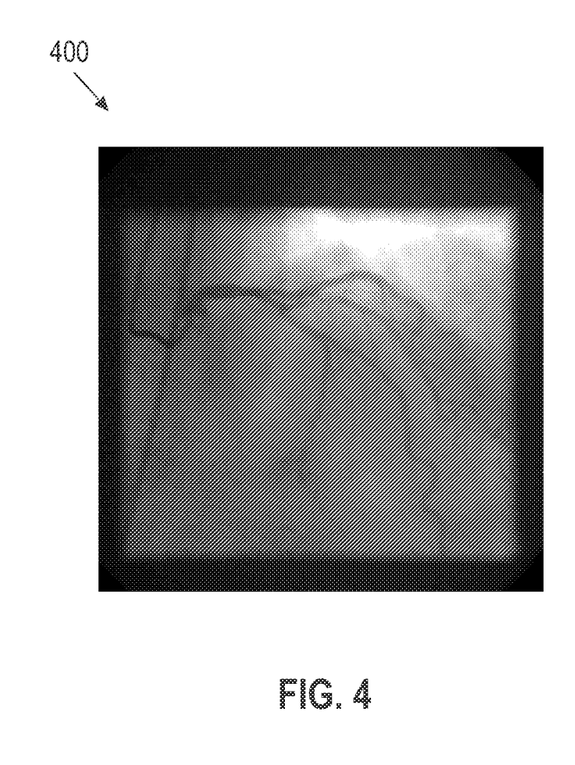
FIG. 4 is an image of an artery from the sequence of images.

FIG. 4 is an image (400) of an artery from the sequence of images. This image is a sample image prior to extraction of the centerline curves. Since the coronary artery trees can be well modeled by their centerlines, the feature extraction essentially looks for intensity ridges that could possibly form centerlines of arteries. In addition, catheter contours are strong and can affect image classification. In one embodiment, the curves of the catheter are detected and removed from consideration. In one embodiment, the catheters are detected on both line width and the value of the second order derivatives.

Figure 5:
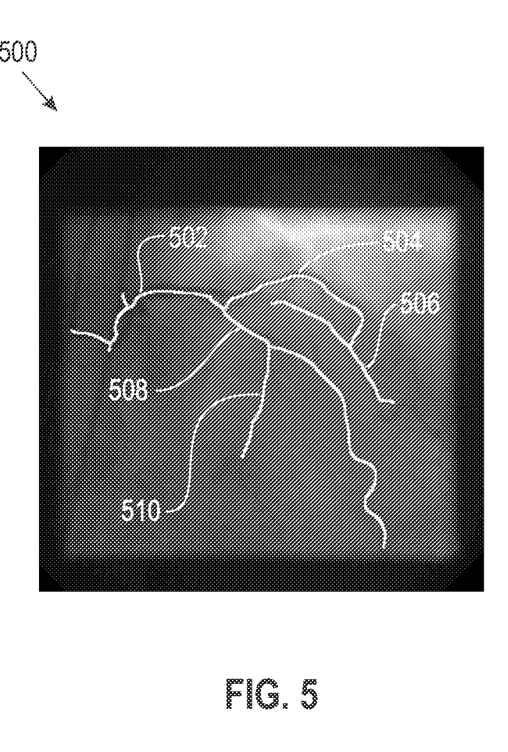
FIG. 5 is an image of the same artery from the sequence of images of FIG. 4 with the centerline curves of the arteries extracted.

FIG. 5 is an image (500) of the same artery from the sequence of images of FIG. 4 with the centerline curves (502), (504), (506), (508), and (510) of the arteries extracted. Accordingly, the images shown in FIGS. 4 and 5 are a single angiogram frame, with FIG. 4 showing the frame prior to extracting the centerlines of the coronary arteries, and FIG. 5 showing the same frame after extracting the centerlines of the coronary arteries.

Figure 6:
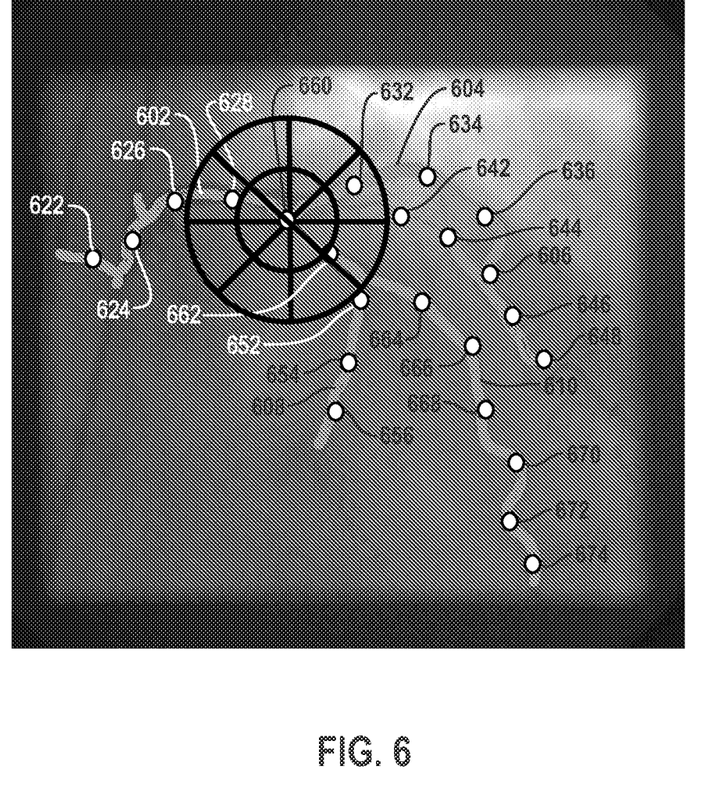
FIG. 6 is a flow chart illustrating a process to extract the centerlines.

The goal in extracting the features is to highlight the presence of arteries when the image depicts such arteries. Coronary artery trees can be well modeled by their centerlines. Specifically, a line structure detector is employed to extract the centerlines of the coronary arteries in angiogram frames. Each pixel in the image is examined to detect the line pixels that are located on or close to the line structures. These line pixels are then linked to form the centerlines. FIG. 6 is a flow chart (600) illustrating a process to extract the centerlines. First the local line direction is determined using the second order directional derivatives of the image (602). In one embodiment, the determination at step (602) is achieved by convolving the image with the derivatives of the Gaussian kernel along one dimension and then convolving along the other dimension. Since dark lines on a bright background are being targeted, the criterion for a salient line is that the second order derivatives are much larger than zero at locations where the first order derivatives are equal to zero. Following step (202) and the detection of line points, the line points are linked (204) to form the centerline (206). The linking starts from the line points whose second directional derivatives are larger than a pre-defined threshold, and end when there are no candidate line points within a pre-defined distance. When adding an appropriate neighbor to the current line, only neighboring pixels that are compatible with the current line direction are examined to ensure that the linking is fast and robust.

There are two important properties regarding the optical flow obtained for the angiogram image sequences, including the deformation fields containing a considerable amount of noise, and motion field magnitude and phase. In one embodiment, the magnitude and phase of the motion field are employed to infer the category of the video sequence. Motion in angiogram images is meaningful when it is associated with anatomical structures. The vessel centerline information is used to guide the feature localization process. More specifically, extracted centerline curves are sampled at regular intervals to generate feature points (106), followed by sampling a surrounding region around the generated feature points to capture shape and motion context of the vessel (108). Accordingly, the sampling at step (106) and (108) ensures that only motion which corresponds to anatomical structures is retained while the remaining extraneous motion is disregarded.

Motion context is defined as a local motion histogram in a radius-angle polar grid to capture local motion around centerlines. The motion feature is thus represented as a distribution over relative positions. Using the local motion context descriptor, the global vessel motion is captured as a pyramid of histograms of motion context (PHMC). Each image is divided into a sequence of increasingly fine spatial grids by repeatedly doubling the number of divisions in each axis direction. The histogram counts associated with the points in each grid cell are recorded. The number of points in a cell at one level is the sum over those contained in the four cells it is divided into at the next level.

A feature vector is formed for classification of vessels (110). More specifically, a histogram of the motion context (HMC) vector is computed for each grid cell pyramid resolution level, with the features constructed from pyramid histograms of shape and motion context. A final HMC descriptor for the image is a concatenation of all the HMC vectors expressed as:

$$F(x)=[H_1(x),H_2(x),\ldots,H_L(x)]$$

where $H_i(x)$ is the histogram vector formed over all the cell regions at level i. $H_1(x)$ is the sparsest partition of the image, $H_i$ doubles the division of the $H_{i-1}$ at each image dimension. $F(x)$ is a vector of concatenated histograms. In forming the pyramid, the grid at level i has $2^{(i+1)}=4^i$ cell regions over the whole image. The feature vector, $F(x)$, per image is referred to as the pyramid histograms of motion context (PHMC). The pyramid histograms of the images from different views become more distinct as the grid level increases. The distance $\chi^2$ between the corresponding PHMC feature vectors is used to measure the similarity between two motion fields. The distance between two vessel shapes may be computed as a weighted sum over $\chi^2$ at each level expressed as:

$$K_M(F_I,F_J)=\Sigma\alpha_i d_i(F_I,F_J)$$

where $\alpha_i$ is the weight at level i, and $d_i$ is the $\chi^2$ distance between the feature vectors. The weight $\alpha_i$ can be either a function of current level i or an unknown parameter to be learned in the recognition algorithm.

Figure 7:
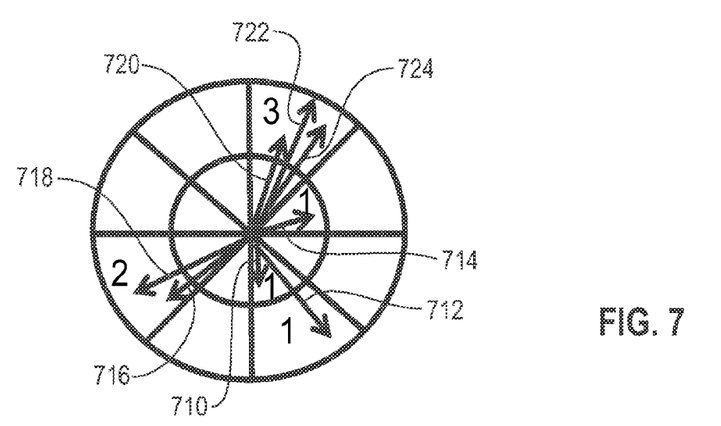
FIG. 7 is a diagram depicting a manner of capturing the shape and motion context.

FIG. 6 is an image (600) of the vessel branches from FIG. 5 showing sampling along regular intervals of each vessel branch. More specifically, branch (602) is shown with four samplings (622), (624), (626) and (628), branch (604) is shown with three samplings (632), (634) and (636), branch (606) is shown with four samplings (642), (644), (646) and (648), branch (608) is shown with three samplings (652), (654) and (656), and branch (610) is shown with eight samplings (660), (662), (664), (666), (668), (670), (672) and (674). As further described above in FIG. 1, a surrounding region of each of the centerline samples, e.g. generated feature points, is evaluated to capture the shape and motion context of the vessel. FIG. 7 is a diagram (700) depicting a manner of capturing the shape and motion context. As shown, FIG. 7 depicts a radius-angle polar grid (702) centered on feature point (660) of FIG. 6. The grid maps out local motion vectors (710)-(724) in polar coordinates, the local motion vectors tracing the localized motion of feature point (660). Each feature point identified in the centerlines is subjected to the same image analysis.

Figure 8:
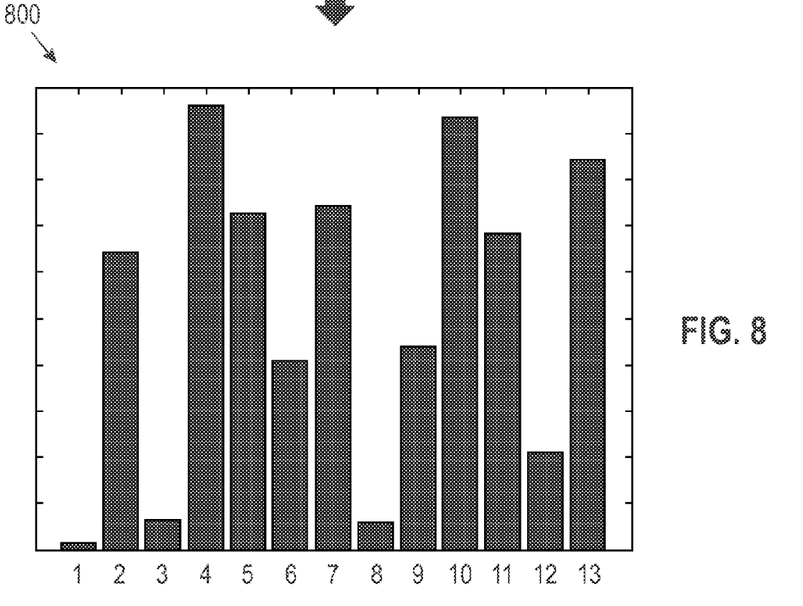
FIG. 8 is a diagram illustrating a sample histogram taken from the local motion vectors in the polar coordinate frame of FIG. 7.

Following the captured shape and motion context in polar form as shown in FIG. 7, a feature vector is formed for classification of the vessel being evaluated. FIG. 8 is a diagram (800) illustrating a sample histogram taken from the local motion vectors in the polar coordinate frame of FIG. 7. A histogram corresponding to each individual feature point is derived and from each histogram a histogram of the shape context vector is computed as mentioned above.

Following the steps of pre-processing a coronary angiography sequence of images as shown in FIG. 1, a multiclass support vector machine (SVM) is trained to determine a set of hyper planes separating data in feature space. In one embodiment, the SVM relies on the dot product in the feature space. The following is pseudo code demonstrating the training of the SVM:
1. Construct the kernel matrix/use the chi-square distance between corresponding pyramid histogram feature vectors.
2. Given feature vectors $F_I$ and $F_J$ compute the kernel matrix element $K_{I,J}$ from two different images I, J
3. Feed the computed kernel matrix to the SVM for training of the classification system.

The kernel matrix element can be expressed as follows:

$$K_M(F_I,F_J)=\sum_{i=1}^{L}\alpha_i d_i(F_I,F_J)$$

where $\alpha_i$ is the weight at level i, and $d_i$ is the $\chi^2$ distance between the feature vectors. The weight $\alpha_i$ can be either a function of the current level i or as an unknown parameter to be learned in a recognition algorithm.

For the problem of vessel recognition, the shape features alone may not be sufficient to distinguish all types of vessel views. For those cases, appearance is a complementary feature to distinguish them. Using the intensity histogram to model local texture, shape and texture contributions are combined as follows:

$$K(x;y)=\beta K_M+\gamma K_S$$

where $\beta$ and $\gamma$ are weights for the shape and appearance kernel, respectively, and $K_M$ is the motion kernel and $K_S$ is the shape kernel. The weights can be learned through multiple kernel learning. Accordingly, the above-described formula may be employed as a tool for image classification.

The classification of angiogram video frames allows the subsequent identification of vessels and characterization of their abnormalities to be focused on those vessels with the best visibility. As described in detail above, a rich descriptor set combines localized texture with shape and layout. The modified shape context gives a local characteristic of an image point. This more local descriptor is combined with the spatial pyramid kernel to provide a global shape representation giving a robust, compact, and discriminative descriptor.

Figure 9:
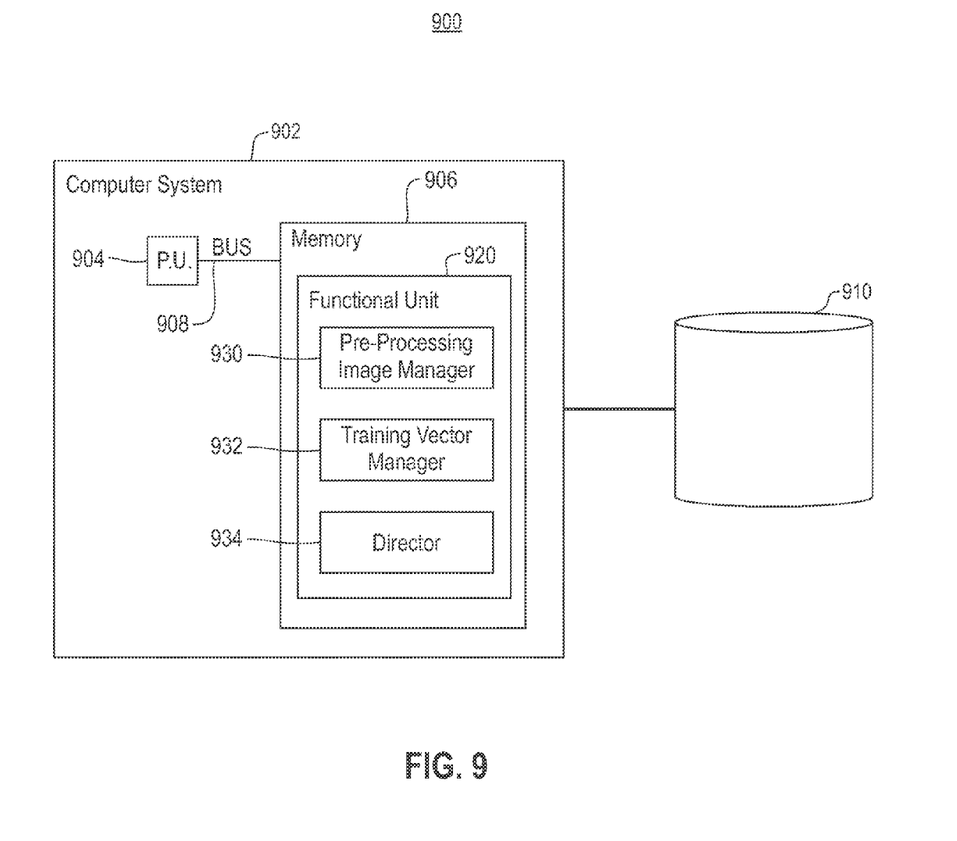
FIG. 9 is a block diagram illustrating tools embedded in a computer system to support the above-described method for classification of coronary artery images.

As demonstrated in FIGS. 1-8, a method is provided to distinguish between the coronary arteries and background images using a shape context descriptor and the learning framework of spatial pyramid kernels. Centerlines of coronary arteries are extracted and the intensity distributions and layouts are represented using a kernel formed from histograms of intensity and shape context. A multi-class support vector machine is then used to classify a new image depicting coronary arteries. FIG. 9 is a block diagram (900) illustrating tools embedded in a computer system to support the above-described method for classification of coronary artery images. A computer system (902) is shown with a processing unit (904) in communication with memory (906) across a bus (908) and in communication with data storage (910). In one embodiment, the data storage (910) is remotely accessed across a network (not shown). A functional unit (920) is provided in communication with the memory (906). The functional unit (920) is provided to classify coronary artery images.

More specifically, the functional unit (920) includes a plurality of managers and a director to support the evaluation and classification, including a pre-processing image manager (930), a training vector manager (932), and a director (934). The pre-processing image manager (930) functions to pre-process a coronary angiography sequence of images. Salient features that characterize appearance of coronary arteries under different viewpoints are extracted. More specifically, the pre-processing image manager (930) functions to: detect and label regions of interest in each image of the sequence, estimate shape and motion in each image frame, sample extracted centerline curves to generate feature points, sample a surrounding region of the generated feature points to capture shape and motion context of the vessel, and form at least one feature vector for classification of vessels.

Specifically, the pre-processing image manager (930) estimates and removes a border associated with the image when detecting and labeling regions of interest, so that the evaluation addresses the image in question and not extraneous image data. With respect to the aspect of estimating shape and motion, the pre-processing image manager (930) extracts centerline curves of vessels in each image and computes an optical flow within an angiogram sequence. For sampling the surrounding region, the pre-processing image manager (930) captures a local shape of the vessel through a modified shape context, captures motion context of the vessel at each point of the vessel shape, and builds a first pyramid histogram representation of the shape of the vessel and second pyramid histogram of the motion of the vessel. The aspect of capturing motion context is represented as a vector with respect to concatenated regions. In addition, with respect to formation of feature vectors, the pre-processing image manager (930) constructs features from pyramid histograms of shape and motion context. Specifically, the pre-processing image manager (930) generates a final pyramid histogram feature vector from the shape and motion context and the classification of the sequence using the computed feature vector. Accordingly, the pre-processing image manager (930) functions to extract salient features that characterize the appearance of coronary arteries under different viewpoints, the extracted features to include prior labeled training sequences and a new sequence.

The training vector manager (932), which is provided in communication with the pre-processing image manager (930), functions to train a multiclass support vector machine to determine a set of hyper planes separating data in feature space. More specifically, the training vector manager (932) derives feature vectors from pyramid histograms of the samplings and employs the angiogram sequences with known viewpoint labels.

The director (934), which is in communication with the training vector manager (932), functions to return a classification result for a new sequence of images based on the recognized shape and motion of the vessel. The director (934) fits the multiclass support vector machine to the computed features. In addition, the director (934) forms a matrix from the combined shape and motion vectors and allocates each row in the matrix to correspond to features at each keypoint and each column to represents one dimension of the shape or motion context.

As identified above, the pre-processing image manager (930), training vector manager (932), and director (934) function to classify images of an angiography sequence of images. The managers and director are shown residing in memory (906) in communication with a processing unit (904). More specifically, managers (930) and (932) and director (934) each reside in the functional unit (920) local to memory (906). In one embodiment, the managers (930) and (932) and director (934) may reside as hardware tools external to memory (906), or they may be implemented as a combination of hardware and software. Similarly, in one embodiment, the managers and the director may be combined into a single functional item that incorporates the functionality of the separate items. As shown herein, each of the managers and the director is shown local to a single processing unit (904). However, in one embodiment the managers and the director may be collectively or individually distributed across a network and function as a unit to construct a gene interaction network. Accordingly, the managers and the director may be implemented as software tools, hardware tools, or a combination of software and hardware tools, to collect and organize data content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, Matlab or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
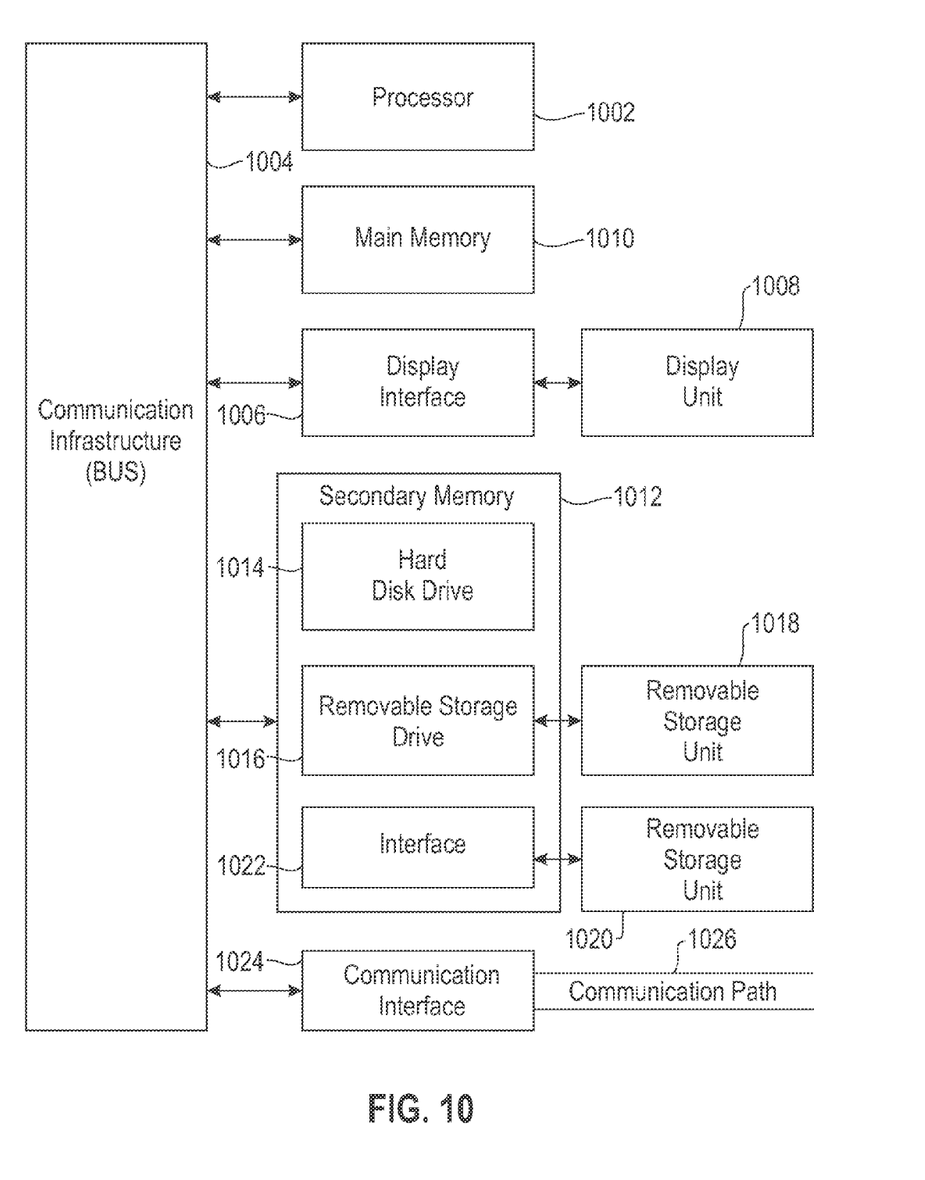
FIG. 10 is a block diagram showing a system for implementing an embodiment of the present invention.

Referring now to FIG. 10 is a block diagram showing a system for implementing an embodiment of the present invention. The computer system includes one or more processors, such as a processor (1002). The processor (1002) is connected to a communication infrastructure (1004) (e.g., a communications bus, cross-over bar, or network). The computer system can include a display interface (1006) that forwards graphics, text, and other data from the communication infrastructure (1004) (or from a frame buffer not shown) for display on a display unit (1008). The computer system also includes a main memory (1010), preferably random access memory (RAM), and may also include a secondary memory (1012). The secondary memory (1012) may include, for example, a hard disk drive (1014) and/or a removable storage drive (1016), representing, for example, a floppy disk drive, a magnetic tape drive, or an optical disk drive. The removable storage drive (1016) reads from and/or writes to a removable storage unit (1018) in a manner well known to those having ordinary skill in the art. Removable storage unit (1018) represents, for example, a floppy disk, a compact disc, a magnetic tape, or an optical disk, etc., which is read by and written to by removable storage drive (1016). As will be appreciated, the removable storage unit (1018) includes a computer readable medium having stored therein computer software and/or data.

In alternative embodiments, the secondary memory (1012) may include other similar means for allowing computer programs or other instructions to be loaded into the computer system. Such means may include, for example, a removable storage unit (1020) and an interface (1022). Examples of such means may include a program package and package interface (such as that found in video game devices), a removable memory chip (such as an EPROM, or PROM) and associated socket, and other removable storage units (1020) and interfaces (1022) which allow software and data to be transferred from the removable storage unit (420) to the computer system.

The computer system may also include a communications interface (1024). Communications interface (1024) allows software and data to be transferred between the computer system and external devices. Examples of communications interface (1024) may include a modem, a network interface (such as an Ethernet card), a communications port, or a PCMCIA slot and card, etc. Software and data transferred via communications interface (1024) are in the form of signals which may be, for example, electronic, electromagnetic, optical, or other signals capable of being received by communications interface (1024). These signals are provided to communications interface (1024) via a communications path (i.e., channel) (1026). This communications path (1026) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1010) and secondary memory (1012), removable storage drive (1016), and a hard disk installed in hard disk drive (1014). Computer programs (also called computer control logic) are stored in main memory (1010) and/or secondary memory (1012). Computer programs may also be received via a communication interface (1024). Such computer programs, when run, enable the computer system to perform the features of the present invention as discussed herein. In particular, the computer programs, when run, enable the processor (1002) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the image classification technique may be applied to other forms of images and should not be limited to images pertaining to coronary arteries. Accordingly, the scope of protection of this invention is limited only by the following claims and their equivalents.

We claim:

1. A computer program product comprising a computer readable storage device having computer readable program code stored therewith, which when executed causes a computer to implement the method comprising:
   detecting and labeling regions of interest in at least a subset of images of the sequence, wherein the region of interest contain a coronary vessel;
   estimating shape and motion in at least the subset of images of the image sequence, including extracting centerline curves of coronary vessels and computing optical flow within an angiogram sequence;
   sampling the extracted centerline curves to generate feature points;
   sampling a surrounding region of the generated feature points to capture shape and motion context of a depicted vessel;
   forming a feature set for classification of the depicted vessel, wherein features of the represented vessels are constructed from pyramid histograms of shape and motion context;
   building a first pyramid histogram representation of a shape of the vessel shape and a second pyramid histogram representation of motion of the vessel; and
   forming a matrix from combined shape and motion vectors, wherein a first dimension in the matrix corresponds to features at each keypoint and a second dimension represents one aspect of the shape context or one aspect of the motion context;
   determining a set of characteristics separating data in feature space, where the feature set is derived from pyramid histograms of the samplings, and the training employs angiogram sequences with known viewpoint labels; and
   returning a classification result for a new sequence of images based on a recognized shape and motion of the vessel, including fitting the multiclass support vector machine to computed features and determining where a vessel feature lies in the feature space against a classification boundary.

2. The computer program product of claim 1, further comprising computer readable program code configured to use recognition stage processing, including computer readable program code which generates a final pyramid histogram feature vector from shape and motion context and classifies the sequence using the computed feature vector.

3. The computer program product of claim 1, further comprising program code configured to detect regions of interest including computer readable program code configured to estimate and remove a border associated with the image.

4. The computer program product of claim 1, wherein the program code configured to sample the surrounding region includes program code which when executed causes a computer to implement the method comprising:
   capturing a local shape of the vessel through a modified shape context; and
   capturing motion context of the vessel at each point of the vessel shape, including capturing motion as a vector with respect to the concatenated regions.

5. The computer program product of claim 4, further comprising program code configured to combine the first and second histograms, including program code configured to concatenate the first and second histograms at each point and form a concatenated vector as a feature vector defining each keypoint.

6. The computer program product of claim 1, further comprising program code configured to extract salient features that characterize the appearance of coronary arteries under different viewpoints, wherein the extracted features include prior labeled training sequences and a new sequence.

7. A system comprising:
   a processor in communication with memory and a storage device, the storage device to store angiographic image sequence data;
   a functional unit in communication with the memory and comprising tools which when executed by the processor classify vessels in the image sequence data, the tools comprising:
   a pre-processing image manager to pre-process a coronary angiography sequence of images, including extraction of salient features that characterize appearance of coronary arteries under different viewpoints, the pre-processing image manager to:
      detect and label regions of interest in at least a subset of images of the sequence;
      estimate shape and motion in at least the subset of images, including extraction of centerline curves of coronary vessels and computation of optical flow within an angiogram sequence;
      sample the extracted centerline curves to generate feature points;
      sample a surrounding region of the generated feature points to capture shape and motion context of the depicted vessel;
      form one or more feature sets for classification of vessels based on the captured shape and motion context;
      build a first pyramid histogram representation of a shape of the vessel shape and a second pyramid histogram representation of motion of the vessel; and
      form a matrix from combined shape and motion vectors, the director to allocate a first dimension in the matrix to correspond to features at each keypoint, and a second dimension to represent one aspect of the shape context or one aspect of the motion context;
   a training vector manager in communication with the pre-processor image manager, the vector manager to train a multiclass support vector machine to determine a set of characteristics separating data in feature space, the training vector manager to derive a feature set from pyramid histograms of the samplings, and employ angiogram sequences with known viewpoint labels; and a director in communication with the vector manager, the director to return a classification result for a new sequence of images based on the recognized shape and motion of the vessel, including fitting the multi-class support vector machine to computed features.

8. The system of claim 7, further comprising the pre-processing image manager to employ recognition stage processing, including generation of a final pyramid histogram feature vector from shape and motion context and classification of the sequence using the computed feature vector.

9. The system of claim 7, wherein the pre-processing image manager estimates and removes a border associated with the image when detecting regions of interest.

10. The system of claim 7, further comprising the pre-processing image manager, when sampling the surrounding region to:
capture a local shape of the vessel through a modified shape context; and
capture motion context of the vessel at each point of the vessel shape, wherein the captured motion is represented as a vector with respect to the concatenated regions.

11. The system of claim 10, further comprising the pre-processing image manager to combine the first and second histograms, including concatenation of the first and second histograms at each point and formation of a concatenated vector as a feature vector defining each keypoint.

12. The system of claim 7, further comprising the pre-processing image manager to extract salient features that characterize the appearance of coronary arteries under different viewpoints, wherein the extracted features include prior labeled training sequences and a new sequence.

13. The computer program product of claim 1, wherein the feature set for classification of the depicted vessel includes a vector, and a set of characteristics separating data in feature space includes hyper planes.

14. The system of claim 7, wherein the feature set for classification of the depicted vessel includes a vector, and a set of characteristics separating data in feature space includes hyper planes.

* * * * *